US008400437B2

(12) United States Patent
Kim et al.

(10) Patent No.: US 8,400,437 B2
(45) Date of Patent: Mar. 19, 2013

(54) DISPLAY DEVICE

(75) Inventors: Jungchul Kim, Bukseong-ri (KR); Hoyoung Lee, Gumi-si (KR); Sungwook Yoon, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 697 days.

(21) Appl. No.: 12/616,520

(22) Filed: Nov. 11, 2009

(65) Prior Publication Data

US 2010/0321348 A1 Dec. 23, 2010

(30) Foreign Application Priority Data

Jun. 22, 2009 (KR) ........................ 10-2009-0055692

(51) Int. Cl.
*G06F 3/038* (2006.01)

(52) U.S. Cl. ........... 345/204; 345/209; 345/211; 345/52

(58) Field of Classification Search ........................ None
See application file for complete search history.

(56) References Cited

U.S. PATENT DOCUMENTS 7,907,113 B2 * 3/2011 Jang et al. ..................... 345/100

* cited by examiner

*Primary Examiner* — Muhammad N Edun
(74) *Attorney, Agent, or Firm* — Brinks Hofer Gilson & Lione

(57) ABSTRACT

An display device includes: a substrate; a display unit comprising subpixels positioned on the substrate; signal lines arranged on the substrate; turn-on circuits connected to the signal lines and turning on the subpixels in response to a turn-on signal supplied through the signal lines; and dummy circuits connected to the signal lines and inducing external electricity introduced through the signal lines to be introduced therein earlier than in the turn-on circuits.

17 Claims, 6 Drawing Sheets

DISPLAY DEVICE

This application claims the benefit of Korea Patent Application No. 10-2009-0055692, filed on Jun. 22, 2009, the entire contents of which is incorporated herein by reference for all purposes as if fully set forth herein.

BACKGROUND

1. Field of the Invention

This document relates to a display device.

2. Discussion of the Related Art

Recently, the importance of a flat panel display (FPD) has been emphasized following the development of multimedia technologies. In response to this trend, various flat type displays such as a liquid crystal display (LCD), a plasma display panel (PDP), and a field emission display (FED) have been put to practical use.

Among them, some display devices, e.g., liquid crystal display devices and organic light emitting display devices, have devices and wires formed in a thin film shape on a substrate by deposition, etching, etc. In the manufacture of such a display device, typically, a plurality of cells serving as display elements are formed on a large substrate for each unit, and then cut out individually during a cell cutting process.

When manufacturing a display device in the above method, there is employed a method in which turn-on circuits for checking the turn-on state of subpixels are formed, along with the subpixels on the substrate. However, in a case where elements, such as subpixels and turn-on circuits, are formed on a substrate by using this method, static electricity may be introduced through signal lines supplying a turn-on signal to the turn-on circuits. It is noted that the introduction of static electricity occurs mostly during the cell cutting process. In this manner, if static electricity is introduced from the outside through signal lines, the turn-on circuits connected to the signal lines are damaged. Then, even if a turn-on signal is supplied through the signal lines in order to determine the turn-on state of the subpixels after the manufacture of the display device, the turn-on state of the subpixels positioned in some areas of the panel cannot be determined. Thus, a solution to this problem is needed.

BRIEF SUMMARY

An aspect of this disclosure is to provide a display device, comprising a substrate, a display unit comprising subpixels positioned on the substrate, signal lines arranged on the substrate, turn-on circuits connected to the signal lines and turning on the subpixels in response to a turn-on signal supplied through the signal lines, and dummy circuits connected to the signal lines and inducing external electricity introduced through the signal lines to be introduced therein earlier than in the turn-on circuits.

Another aspect of this disclosure is to provide a display device, comprising a substrate, a display unit comprising subpixels positioned on a substrate, signal lines arranged on the substrate, turn-on circuits connected to the signal lines and turning on the subpixels in response to a turn-on signal supplied through the signal lines, and dummy circuits connected to the signal lines with a higher priority than the turn-on circuits.

BRIEF DESCRIPTION OF THE DRAWINGS

The accompany drawings, which are included to provide a further understanding of the present disclosure and are incorporated on and constitute a part of this specification illustrate embodiments of the disclosure and together with the description serve to explain the principles of the present disclosure.

DETAILED DESCRIPTION OF THE DRAWINGS AND THE PRESENTLY PREFERRED EMBODIMENTS

Reference will now be made in detail embodiments of the present disclosure examples of which are illustrated in the accompanying drawings.

Hereinafter, a specific exemplary embodiment of the present invention will be described with reference to the accompanying drawings.

Figure 1:
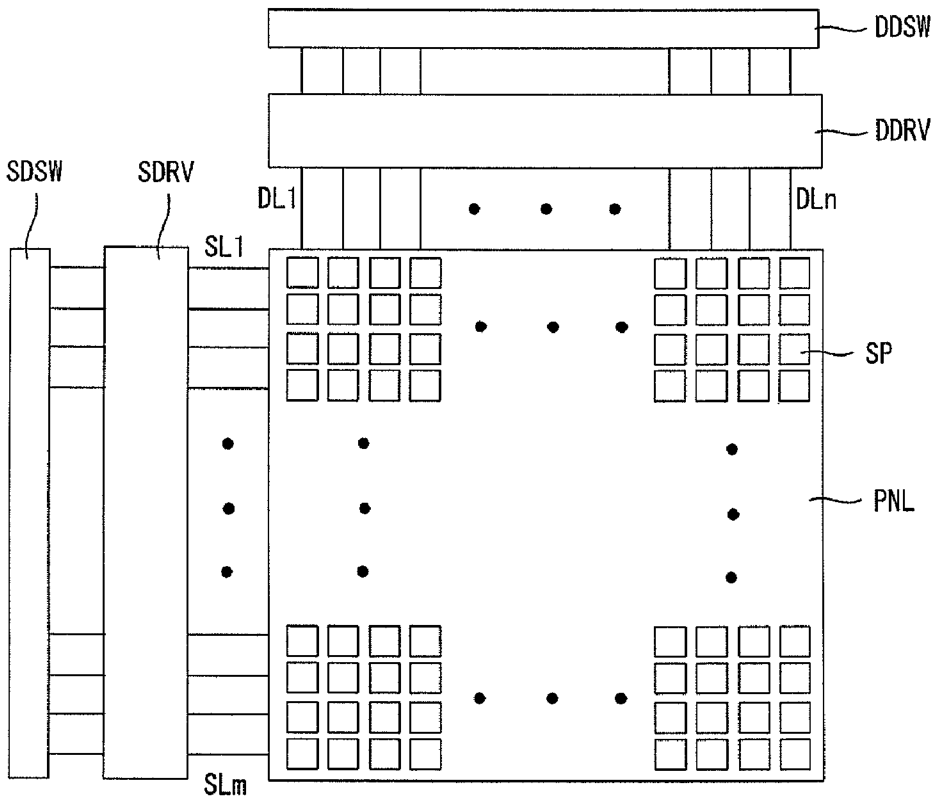
FIG. 1 is a schematic block diagram of a display device according to one exemplary embodiment of the present disclosure.

Referring to FIG. 1, a display device according to the exemplary embodiment of the present disclosure comprises a panel PNL, a scan driver SDRV, a data driver DDRV, and a turn-on driver SDSW and DDSW.

The panel PNL comprises subpixels SP arranged in a matrix. The subpixels SP may be implemented in a liquid crystal display panel comprising a switching transistor, a capacitor, and a liquid crystal layer, or in an organic light emitting display panel comprising a switching transistor, a capacitor, and an organic light emitting diode.

The scan driver SDRV supplies scan signals through scan lines SL1 to SLm connected to the subpixels SP.

The data driver DDRV supplies data signals through data lines DL1 to DLn connected to the subpixels SP.

The turn-on driver SDSW and DDSW comprise turn-on circuits configured to determine the turn-on state of the subpixels SP through the scan lines SL1 to SLm and the data lines DL1 to DLn and dummy circuits which, upon receipt of external electricity, induce the external electricity to be introduced therein earlier than in the turn-on circuits.

Hereinafter, the circuit configuration of the subpixels SP will be described.

Figure 2:
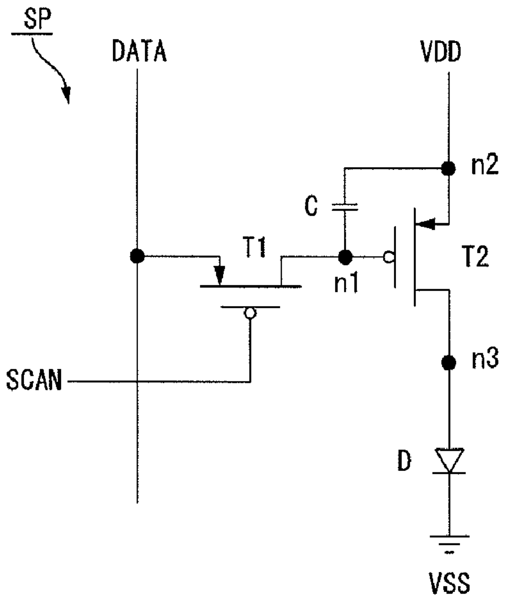
FIG. 2 is an illustration of a circuit configuration of a subpixel of FIG. 1.

Referring to FIG. 2, the subpixels SP have a 2T(Transistor) 1C(Capacitor) structure, and may be implemented in an organic light emitting display device.

Each subpixel SP comprises a first transistor T1, a second transistor T2, a capacitor C, and an organic light emitting diode D. For the first transistor T1, a gate electrode is connected to a scan line SCAN, a first electrode is connected to a data line DATA, and a second electrode is connected to a first node n1. For the second transistor T2, a gate electrode is connected to the first node n1, a first electrode is connected to a second node n2 connected to a high potential power line VDD, and a second electrode is connected to a third node n3. For the capacitor C, one end is connected to the first node n1, and the other end is connected to the second node n2. For the organic light emitting diode D, an anode is connected to the third node n3, and a cathode is connected to a low potential power line VSS.

The above-described subpixel SP operates as follows.

When a scan signal is supplied to the subpixel SP through the scan line SCAN, the first transistor T1 is turned on. Next, when a data signal supplied through the data line DATA is supplied to the first node n1 through the turned-on first transistor T1, the capacitor C stores the data therein as a data voltage. Next, when the scan signal is interrupted and the first transistor T1 is turned off, the second transistor T2 is driven corresponding to the data voltage stored in the capacitor C. Next, when the high potential power supplied through the high potential power line VDD flows through the low potential power line VSS, the organic light emitting diode D is turned on. However, this is merely an example of the driving method, and the exemplary embodiment of the present disclosure is not limited thereto.

Figure 3:
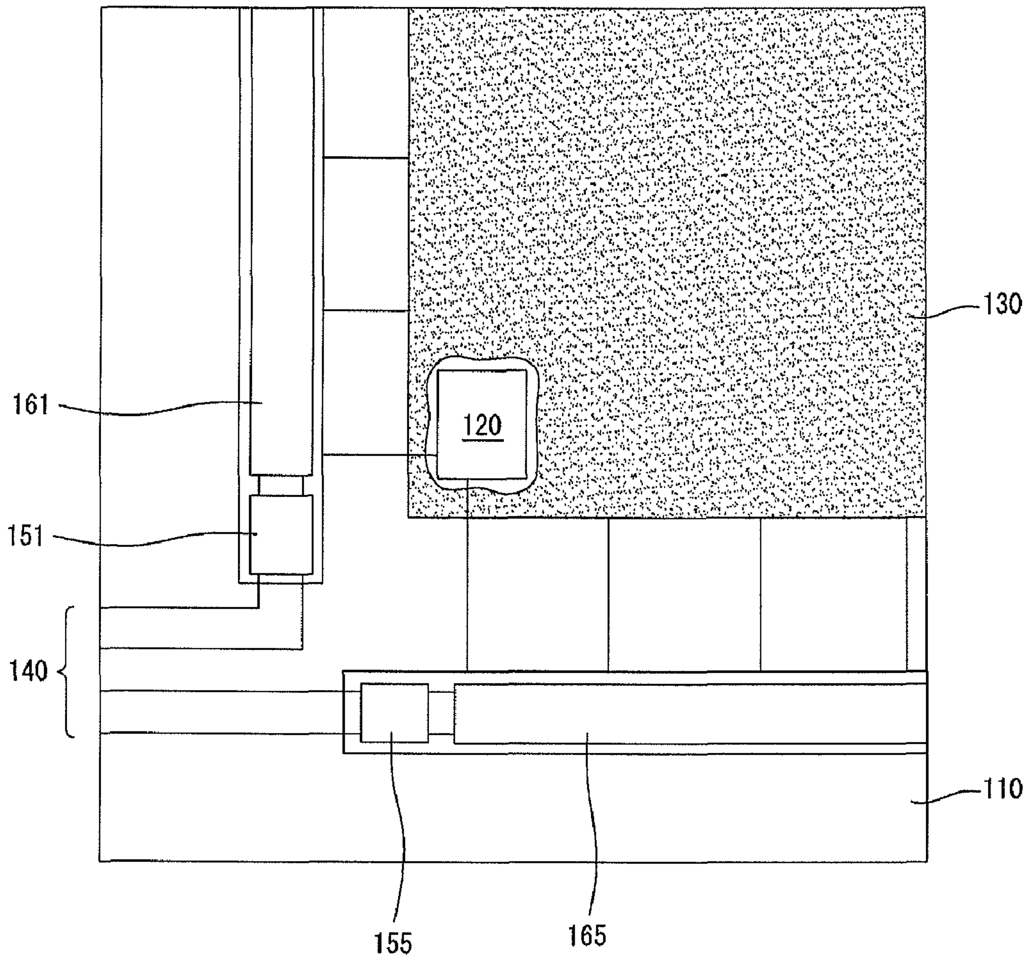
FIG. 3 is a plane view schematically showing a display device according to one exemplary embodiment of the present disclosure.

Referring to FIG. 3, the display device according to one exemplary embodiment of the present disclosure comprises a display unit 130 positioned on a substrate 110, signal lines 140, dummy circuits 151 and 155, and turn-on circuits 161 and 165.

The display unit 130 comprises subpixels 120 positioned on the substrate 110 and arranged in a matrix.

The signal lines 140 are wired from the outside of the display unit 130 to the inner or neighboring areas of the display unit 130, being arranged on the substrate 110 separately from one another depending on the positions of the turn-on circuits 161 and 165 and the dummy circuits 151 and 155.

The turn-on circuits 161 and 165 are connected to the signal lines 140, and turn on the subpixels 120 in response to a turn-on signal supplied through the signal lines 140.

The dummy circuits 151 and 155 are connected to the signal lines 140, and induce external electricity (hereinafter, static electricity) introduced through the signal line 140 to be introduced therein earlier than in the turn-on circuits. To this end, the dummy circuits 151 and 155 are positioned in a higher-priority area than the turn-on circuits 161 and 165 are such that the static electricity is introduced in the order of the signal lines 140, the dummy circuits 151 and 155, and the turn-on circuits 161 and 165.

The dummy circuits 151 and 155 comprise dummy transistors connected in parallel to the gate electrodes and first electrodes of the switching transistors included in the turn-on circuits 161 and 165. At least one of the dummy transistors is formed in the same structure as the switching transistors included in the turn-on circuits 161 and 165. That is, the dummy circuits 151 and 155 may be formed under the same condition in the same process as the switching transistors included in the turn-on circuits 161 and 165 so as match the load condition. However, the dummy circuits 151 and 155 may be larger or smaller in size than the switching transistors included in the turn-on circuits 161 and 165.

Hereinafter, the exemplary embodiment will be described with respect to an example in which the display device is configured as an organic light emitting display device.

Figure 4:
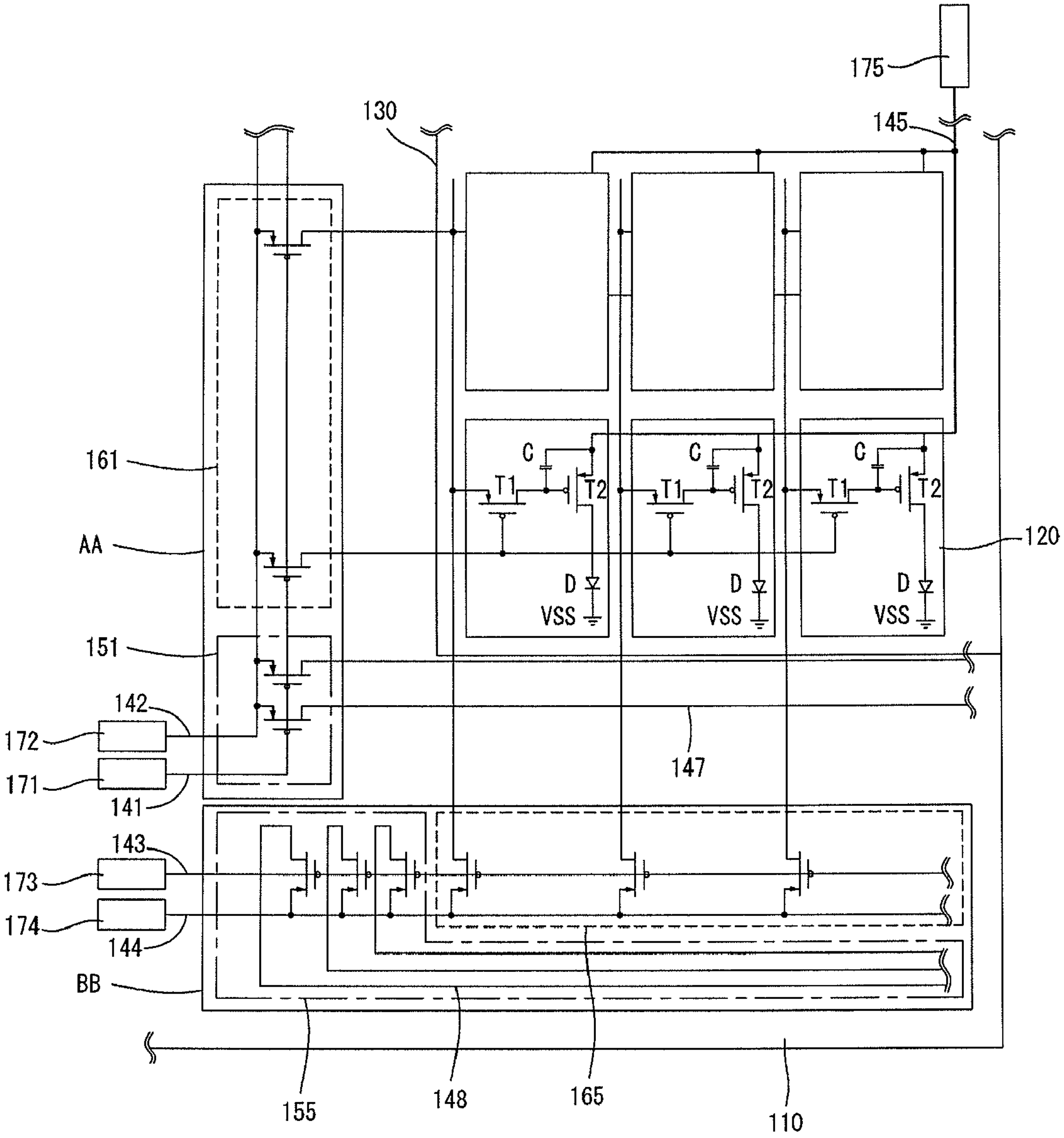
FIG. 4 is a circuit diagram comprising an organic light emitting display device according to one exemplary embodiment of the present disclosure.

Referring to FIG. 4, each of the subpixels 120 arranged in the display unit 130 comprises a first transistor T1, a second transistor T2, a capacitor C, and an organic light emitting diode D.

The signal lines 141 to 145 comprise a first signal line 141 connected to gate electrodes of a first dummy transistor group 151, second signal lines 142 connected to first electrodes of the first dummy transistor group 151, a third signal line 143 connected to gate electrodes of a second dummy transistor group 155, fourth signal lines 144 connected to first electrodes of the second dummy transistor group 155, and fifth signal lines 145 connected to a high potential power line of the subpixels 120. The signal lines 141 to 145 are connected to signal pads 171 to 175, respectively.

The turn-on circuits 161 and 165 comprise a first switching transistor group 161 for supplying a first driving signal to the gate electrodes of the first transistors T1 included in the subpixels 120 and a second switching transistor group 165 for supplying a second driving signal to the first electrodes of the first transistors T1.

When a first driving signal is supplied, the first transistors T1 included in the subpixels 120 are turned on. Next, when a second driving signal is supplied, a data voltage is stored in the capacitors C included in the subpixels 120. That is, the first switching transistor group 161 is a transistor group which delivers a signal so as to drive the first transistors T1 included in the subpixels 120, and the second switching transistor group 165 is a transistor group which delivers a signal so as to store a data voltage in the capacitors C included in the subpixels 120. The turn-on circuits 161 and 165 having the above-mentioned configuration are formed on the substrate 110, being separated into the first switching transistor group 161 and the second switching transistor group 165 so that they are positioned in the left outside area AA and the bottom outside area BB of the display unit 130, respectively.

The dummy circuits 151 and 155 comprise the first dummy transistor group 151 connected in parallel to the gate electrodes and first electrodes of the first switching transistor group 161 and disposed in the left outside area AA and the second dummy transistor group 155 connected in parallel to the gate electrodes and first electrodes of the second switching transistor group 165 and disposed in the bottom outside area BB.

The first dummy transistor group 151 is connected to the first and second signal lines 141 and 142, which are some of the signal lines 141 to 145, in an area preceding a lower-priority area where the first switching transistor group 161 is positioned. The second dummy transistor group 155 is connected to the third and fourth signal lines 143 and 144, which are some of the signal lines 141 to 145, in an area preceding a lower-priority area where the second switching transistor group 165 is positioned. Therefore, the dummy circuits 151 and 155 are formed more adjacent to the first to fourth signal pads 171 to 174, which are some of the signal pads 171 to 175, than to the turn-on circuits 161 and 165.

Among the electrodes of the first dummy transistor group 151 and second dummy transistor group 155, the second electrodes not connected to the gate electrodes and first electrodes of the first switching transistor group 161 and second switching transistor group 165 may be adapted to be electrically floated. The floated second electrodes may be connected to electrically floated lines 147 and 148 in order to establish the same load condition as the first switching transistor group 161 and the second switching transistor group 165.

Hereafter, an introduction path of static electricity and the principle of dissipation of introduced static electricity will be described with reference to FIG. 5.

Figure 5:
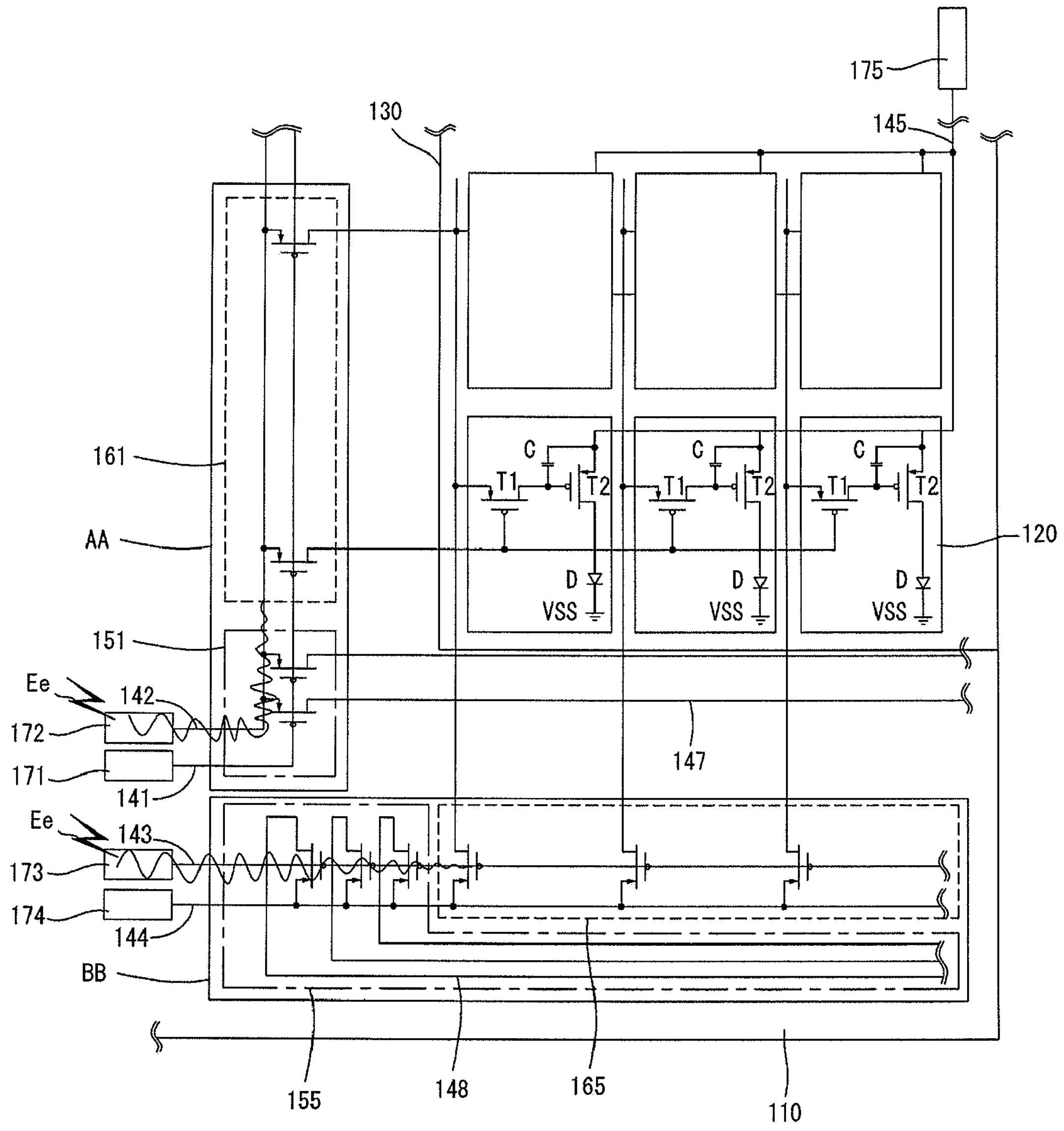
FIG. 5 is a view for explaining a dissipation path of introduced static electricity.

Referring to FIG. 5, static electricity Ee may be introduced through the signal lines 141 to 145 positioned on the outermost side from the display unit 130. For example, if static electricity Ee is introduced into the second and third signal lines 142 and 143 of the signal lines 141 to 145, the static electricity Ee introduced into the second and third signal lines 142 and 143 flows along the path of the lines into which the static electricity Ee is firstly introduced, and then introduced into the first dummy transistor group 151 and the second dummy transistor group 155 to thus damage them, whereby the introduced static electricity Ee becomes weaker than in the initial stage. Accordingly, with the number of the first dummy transistor group 151 and the second dummy transistor group 155 positioned on this path being denoted by N (N is an integer of 1 or greater), if they are connected in parallel to each other, the amount of the introduced static electricity Ee becomes smaller in proportion to the number of the first dummy transistor group 151 and the second dummy transistor group 155. As a result, the turn-on circuits 161 and 165 positioned subsequent to the first dummy transistor group 151 and the second dummy transistor group 155 can be safely protected by the dummy circuits 151 and 155.

Hereinafter, a display device according to another exemplary embodiment will be described.

Figure 6:
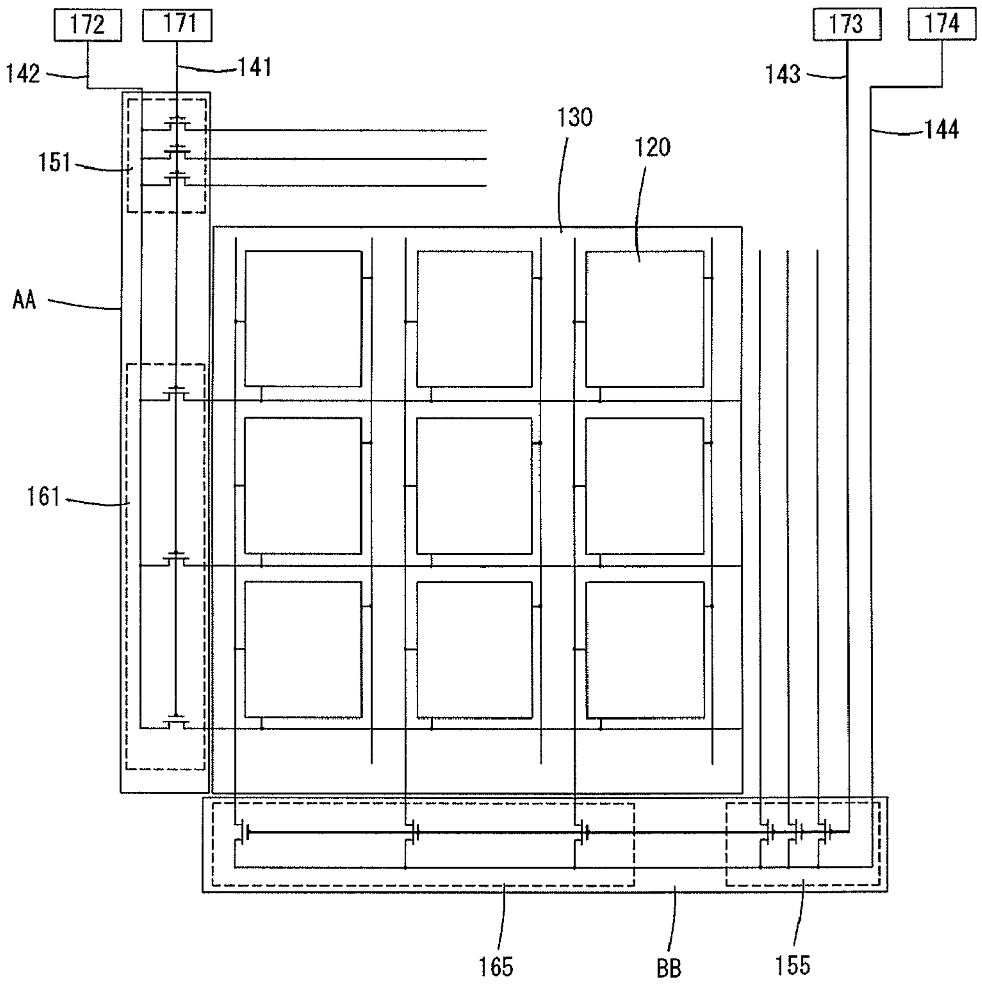
FIGS. 6 and 7 are circuit diagrams of a display device implemented according to another exemplary embodiment of the present disclosure.

Referring to FIG. 6, a display unit 130 comprising subpixels 120 arranged in a matrix is disposed. The subpixels 120 may be implemented in a liquid crystal element comprising a switching transistor, a capacitor, and a liquid crystal layer, or an organic light emitting element comprising a switching transistor, a capacitor, and an organic light emitting diode.

Signal lines 141 to 144 comprise a first signal line 141 connected to gate electrodes of a first dummy transistor group 151 of dummy circuits 151 and 155, second signal lines 142 connected to first electrodes of the first dummy transistor group 151, a third signal line 143 connected to gate electrodes of a second dummy transistor group 155 of the dummy circuits 151 and 155, and fourth signal lines 144 connected to first electrodes of the second dummy transistor group 155. The signal lines 141 to 144 are connected to signal pads 171 to 174, respectively.

Turn-on circuits 161 and 165 comprise a first switching transistor group 161 for supplying a first driving signal to the subpixels 120 and a second switching transistor group 165 for supplying a second driving signal to first transistors T1. The turn-on circuits 161 and 165 having the above-mentioned configuration are separated into the first switching transistor group 161 and the second switching transistor group 165 so that they are positioned in the left outside area AA and the bottom outside area BB of the display unit 130, respectively.

The dummy circuits 151 and 155 comprise the first dummy transistor group 151 connected in parallel to the gate electrodes and first electrodes of the first switching transistor group 161 and disposed in the left outside area AA and the second dummy transistor group 155 connected in parallel to the gate electrodes and first electrodes of the second switching transistor group 165 and disposed in the bottom outside area BB.

The first dummy transistor group 151 is connected to the first and second signal lines 141 and 142 in an area preceding a lower-priority area where the first switching transistor group 161 is positioned. The second dummy transistor group 155 is connected to the third and fourth signal lines 143 and 144 in an area preceding a lower-priority area where the second switching transistor group 165 is positioned. Therefore, the dummy circuits 151 and 155 are formed more adjacent to the first to fourth signal pads 171 to 174 than to the turn-on circuits 161 and 165.

Among the electrodes of the first dummy transistor group 151 and second dummy transistor group 155, the second electrodes not connected to the gate electrodes and first electrodes of the first switching transistor group 161 and second switching transistor group 165 may be adapted to be electrically floated. The floated second electrodes may be connected to electrically floated lines 147 and 148 in order to match the load condition with the first switching transistor group 161 and the second switching transistor group 165.

FIG. 6 shows one example in which the first to fourth signal lines 141 and 144 are wired on an upper outside of the display unit 130 unlike FIG. 4. As shown in FIG. 6, the dummy circuits 151 and 155 are formed adjacent to the first to fourth signal pads 171 to 174 which is easy to introduce static electricity therein. Therefore, even if static electricity is introduced through the first to fourth signal pads 171 to 174, a considerable part thereof is induced, and thus the degree of damage to the turn-on circuits 161 and 165 is slight.

Figure 7:
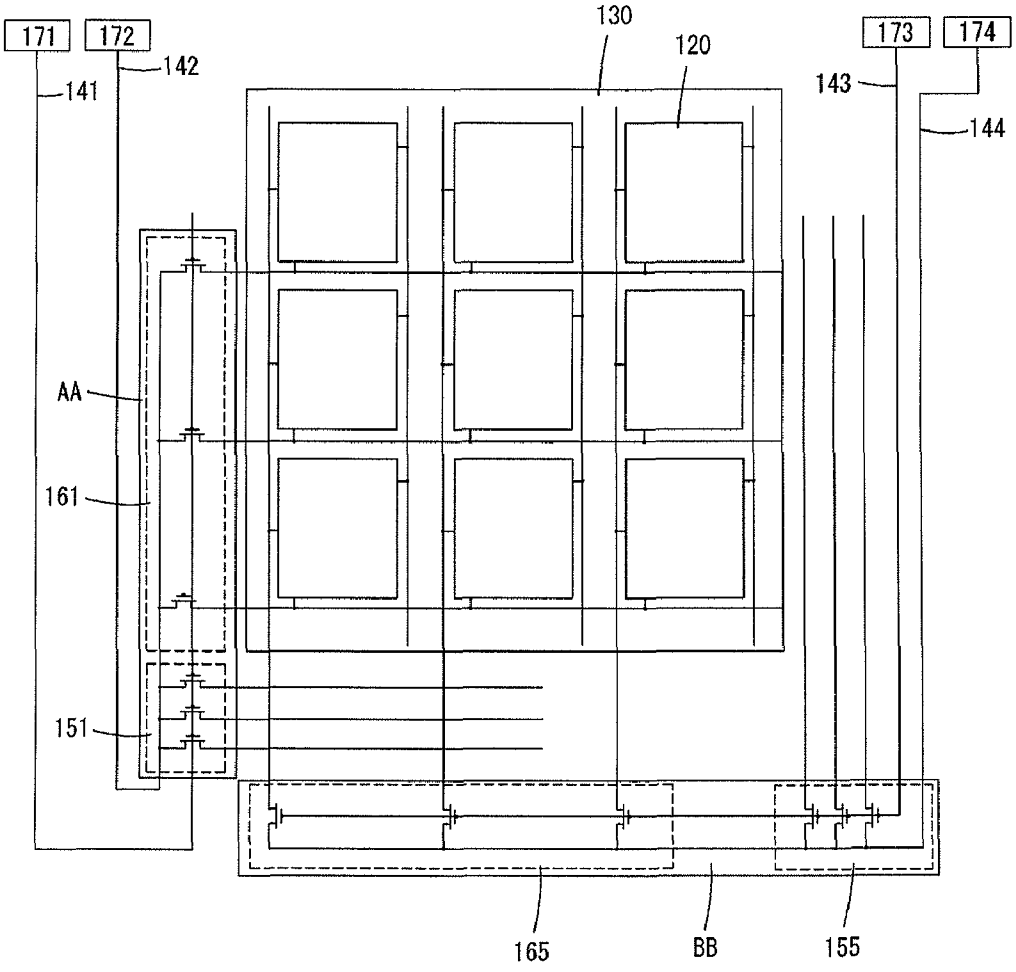

Referring to FIG. 7, the display device has a similar circuit configuration to that of FIG. 6 except that, in FIG. 7, the path between the first to fourth signal lines 141 to 144 and the dummy circuits 151 and 155 are longitudinally wired unlike FIG. 6. In this structure, if static electricity is introduced through the first to fourth signal pads 171 to 174, the static electricity flows along the longitudinally wired first to fourth signal pads 171 to 174 and therefore part of it may be discharged. Afterwards, as the static electricity passes through the dummy circuits 151 and 155, a considerable part thereof can be induced so as to be discharged.

As seen above, the present disclosure provides a display device, which is capable of preventing the turn-on circuits or the circuits included in the subpixels from being damaged by static electricity introduced from the outside in the manufacturing process of the display device having the turn-on circuits in order to determine the turn-on state of the subpixels formed on a panel.

The foregoing exemplary embodiment is applied to a method in which subpixels and turn-on circuits for determining the turn-on state of the subpixels are formed on a substrate in the manufacturing process of a display device. According to the exemplary embodiment, a plurality of cells which will serve as a display device are formed on a large mother substrate for each unit, and even if static electricity is introduced during a process for cutting the plurality of cells individually, dummy circuits can distribute the static electricity. Subsequently, the present disclosure can improve yield in the manufacture of a display device and achieve price competitiveness because a circuit design can be done in such a manner as to prevent the turn-on circuits from being damaged by static electricity introduced in the manufacturing process of the display device.

The foregoing embodiments and advantages are merely exemplary and are not to be construed as limiting the present disclosure. The present teaching can be readily applied to other types of apparatuses. The description of the present disclosure is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such as limitation is not intended to be interpreted under 35 USC 112 (6).

The invention claimed is:

1. An display device comprising:

a substrate;

a display unit comprising subpixels positioned on the substrate;

signal lines arranged on the substrate; turn-on circuits connected to the signal lines and turning on the subpixels in response to a turn-on signal supplied through the signal lines; and dummy circuits connected to the signal lines and inducing external electricity introduced through the signal lines to be introduced therein earlier than in the turn-on circuits, wherein the signal lines are connected to signal pads, respectively, and the dummy circuits are more adjacent to the signal pads than to the turn-on circuits.

2. The display device of claim 1, wherein the dummy circuits are connected to the signal lines in a region preceding the turn-on circuits.

3. The display device of claim 1, wherein the dummy circuits comprise dummy transistors connected in parallel to gate electrodes and first electrodes of switching transistors included in the turn-on circuits.

4. The display device of claim 3, wherein at least one of the dummy transistors is formed in the same structure as the switching transistors.

5. The display device of claim 1, wherein the second electrodes not connected to the gate electrodes and first electrodes of the switching transistors are electrically floated.

6. The display device of claim 5, wherein, among the electrodes of the dummy transistors, the floated second electrodes are connected to electrically floated lines.

7. The display device of claim 6, wherein the turn-on circuits comprise:

a first switching transistor group for supplying a first driving signal to gate electrodes of first transistors included in the subpixels; and a second switching transistor group for supplying a second driving signal to first electrodes of the first transistors.

8. The display device of claim 6, wherein the dummy circuits comprise:

a first dummy transistor group connected in parallel to the gate electrodes and first electrodes of the first switching transistor group; and a second dummy transistor group connected in parallel to the gate electrodes and first electrodes of the second switching transistor group.

9. The display device of claim 1, wherein the signal lines comprise:

a first signal line connected to gate electrodes of the first dummy transistor group included in the dummy circuits;

second signal lines connected to first electrodes of the first dummy transistor group;

a third signal line connected to gate electrodes of the second dummy transistor group;

fourth signal lines connected to first electrodes of the second dummy transistor group; and fifth signal lines connected to a high potential power line of the subpixels.

10. A display device comprising:

a substrate;

a display unit comprising subpixels positioned on a substrate;

signal lines arranged on the substrate;

turn-on circuits connected to the signal lines and turning on the subpixels in response to a turn-on signal supplied through the signal lines; and dummy circuits connected to the signal lines with a higher priority than the turn-on circuits, wherein the signal lines are connected to signal pads, respectively, and the dummy circuits are more adjacent to the signal pads than to the turn-on circuits.

11. The display device of claim 10, wherein the dummy circuits comprise dummy transistors connected in parallel to gate electrodes and first electrodes of switching transistors included in the turn-on circuits.

12. The display device of claim 11, wherein the second electrodes not connected to the gate electrodes and first electrodes of the switching transistors are electrically floated.

13. The display device of claim 12, wherein, among the electrodes of the dummy transistors, the floated second electrodes are connected to electrically floated lines.

14. The display device of claim 11, wherein at least one of the dummy transistors is formed in the same structure as the switching transistors.

15. The display device of claim 10, wherein the turn-on circuits comprise:

a first switching transistor group for supplying a first driving signal to gate electrodes of first transistors included in the subpixels; and a second switching transistor group for supplying a second driving signal to first electrodes of the first transistors.

16. The display device of claim 15, wherein the dummy circuits comprise:

a first dummy transistor group connected in parallel to the gate electrodes and first electrodes of the first switching transistor group; and a second dummy transistor group connected in parallel to the gate electrodes and first electrodes of the second switching transistor group.

17. The display device of claim 10, wherein the signal lines comprise:

a first signal line connected to gate electrodes of the first dummy transistor group included in the dummy circuits;

second signal lines connected to first electrodes of the first dummy transistor group;

a third signal line connected to gate electrodes of the second dummy transistor group;

fourth signal lines connected to first electrodes of the second dummy transistor group; and fifth signal lines connected to a high potential power line of the subpixels.

* * * * *